C. R. SCUDDER AND J. B. HUGUELET.
MACHINE FOR AFFIXING FASTENINGS TO ENVELOPES.
APPLICATION FILED JULY 19, 1920.

1,405,014.

Patented Jan. 31, 1922.
6 SHEETS—SHEET 1.

C. R. SCUDDER AND J. B. HUGUELET.
MACHINE FOR AFFIXING FASTENINGS TO ENVELOPES.
APPLICATION FILED JULY 19, 1920.

1,405,014.

Patented Jan. 31, 1922.

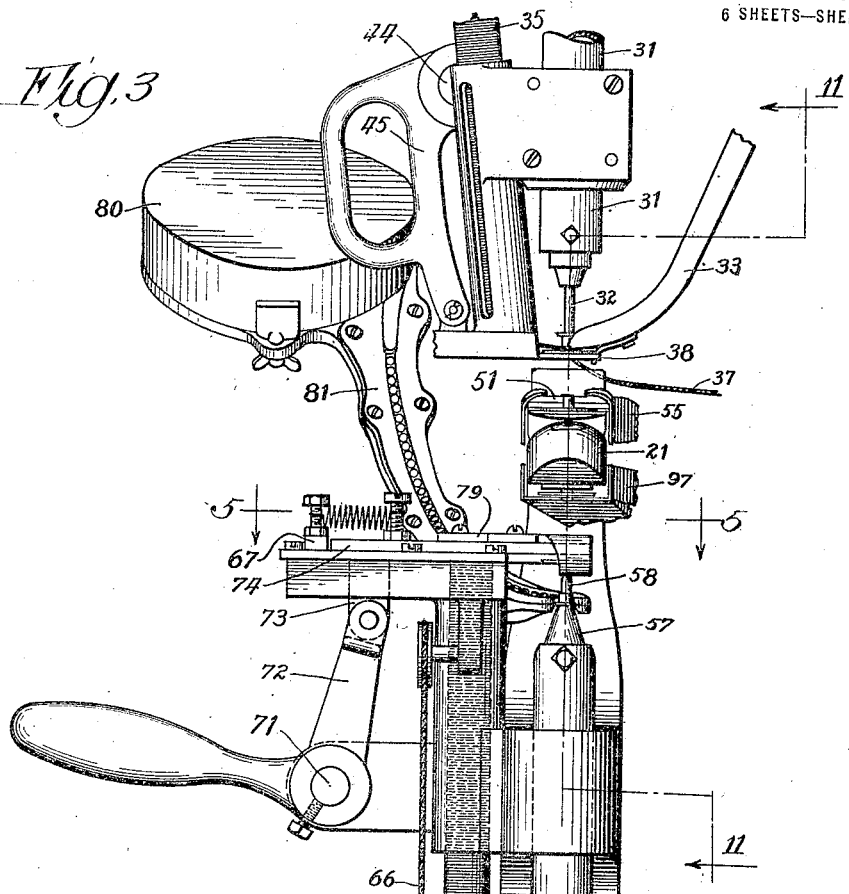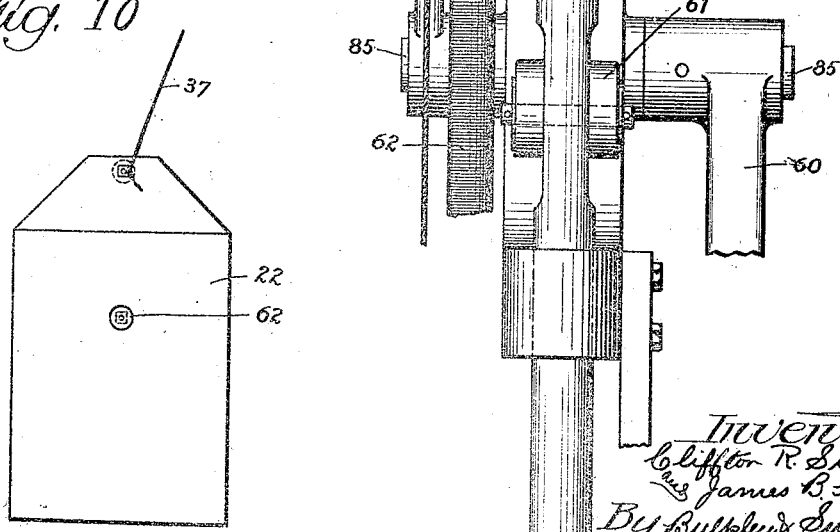

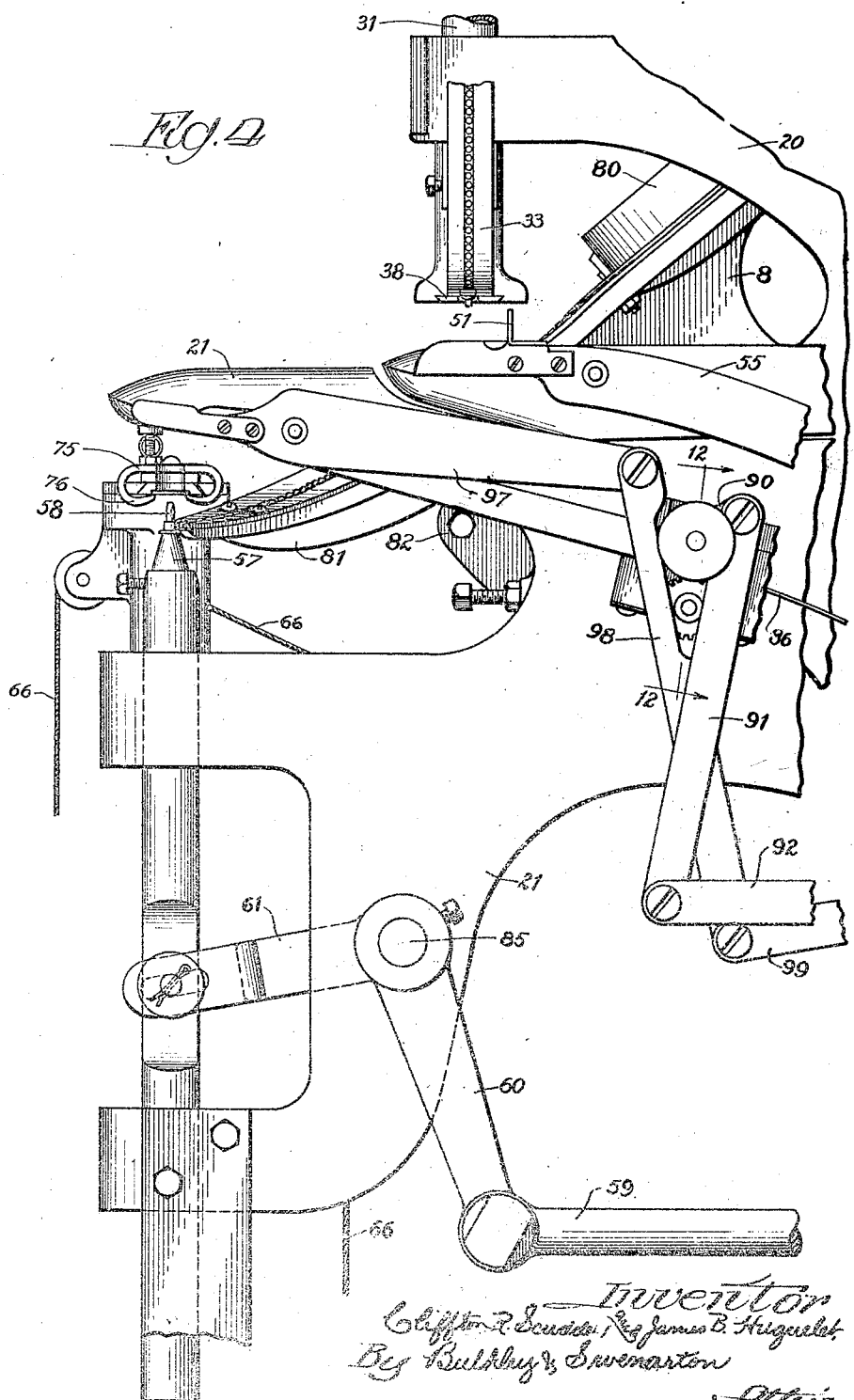

C. R. SCUDDER AND J. B. HUGUELET.
MACHINE FOR AFFIXING FASTENINGS TO ENVELOPES.
APPLICATION FILED JULY 19, 1920.
1,405,014.
Patented Jan. 31, 1922.
6 SHEETS—SHEET 5.
Fig. 5
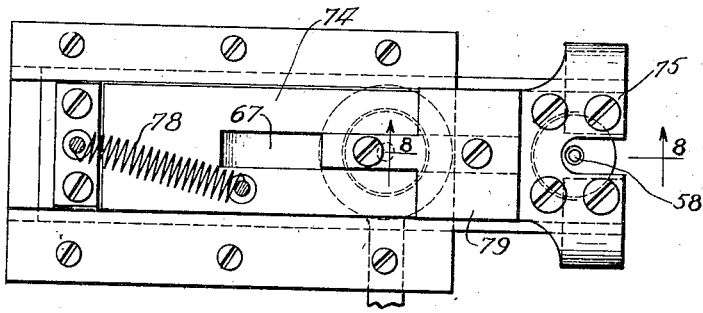
Fig. 6
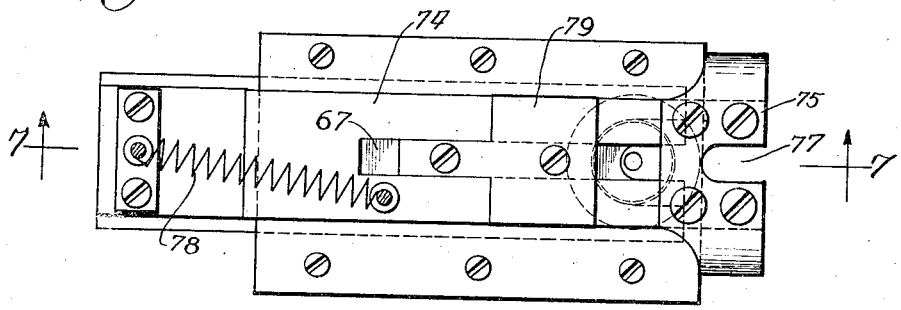
Fig. 7
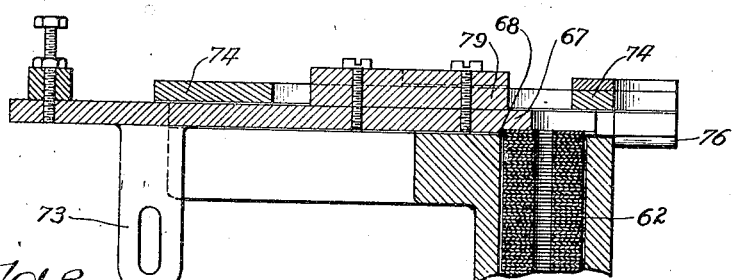
Fig. 8
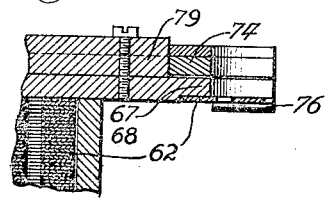
Fig. 9
Inventor:
Clifton R. Scudder
and James B. Huguelet,
By Bulkley & Swenarton
Attys.

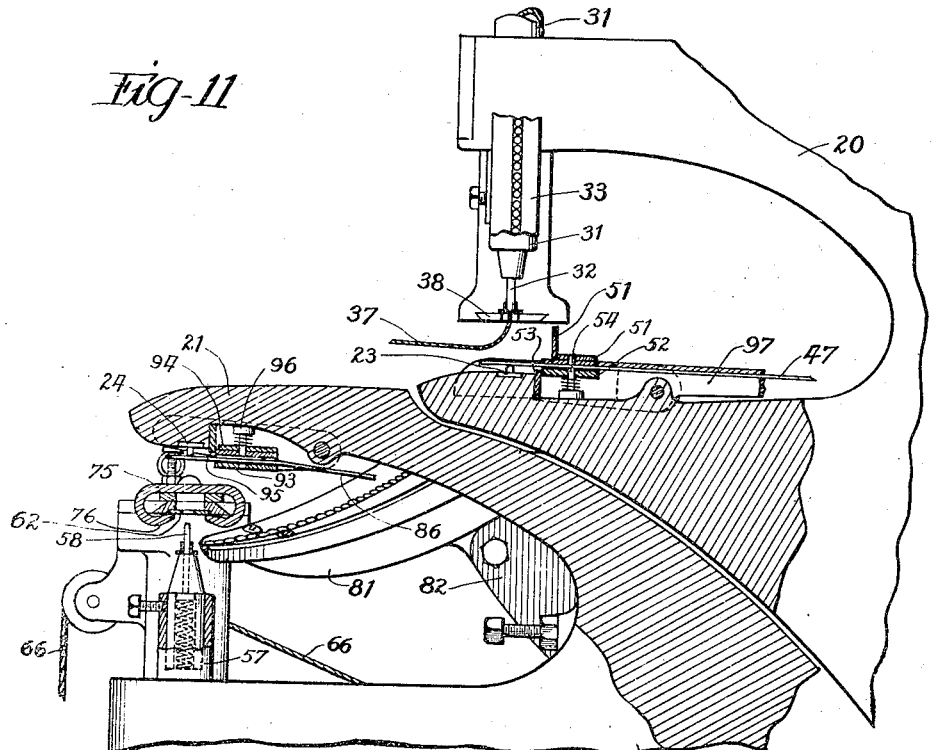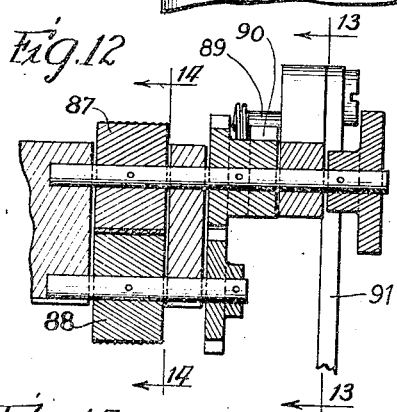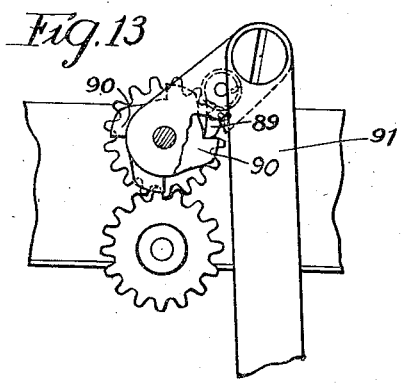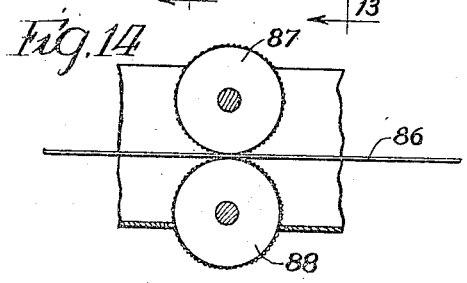

UNITED STATES PATENT OFFICE.

CLIFFTON R. SCUDDER, OF ST. LOUIS, MISSOURI, AND JAMES B. HUGUELET, OF CHICAGO, ILLINOIS, ASSIGNORS TO SAMUEL CUPPLES ENVELOPE COMPANY, OF CHICAGO, ILLINOIS, A CORPORATION OF MISSOURI.

MACHINE FOR AFFIXING FASTENINGS TO ENVELOPES.

1,405,014. Specification of Letters Patent. Patented Jan. 31, 1922.

Application filed July 19, 1920. Serial No. 397,242.

*To all whom it may concern:*

Be it known that we, CLIFFTON R. SCUDDER and JAMES B. HUGUELET, citizens of the United States of America, and residents of St. Louis, Missouri, and Chicago, Cook County, Illinois, respectively, have invented a certain new and useful Improvement in Machines for Affixing Fastenings to Envelopes, of which the following is a specification.

Our invention relates to a machine for affixing fastenings to envelopes, and particularly to that type of machine in which the seal flap and body of the envelope are provided with a circular washer or disk attached thereto by eyelets to one of which a closing cord or string is attached with the free end adapted to be wound successively around the two eyelets and beneath the washers thereby securely uniting the seal flap and body of the envelope.

In machines of this character as heretofore constructed, it has been necessary to perform separate and distinct operations in order to apply the fastening means to the seal flap and to the body of the envelope. The object of our invention is to provide a machine in which the fastening means may be applied to the body of the envelope at one and the same time that the fastening means is secured to the seal flap, these two fastening means being applied by a single operation of the machine.

These and other features and objects of our invention will be more readily understood by having reference to the accompanying drawings in which we have illustrated one embodiment of our invention.

Fig. 3 is an enlarged front elevation of a portion of the machine.

Fig. 4 is an enlarged side elevation of a part of the machine as shown in Fig. 1.

Figs. 5 and 6 are detail plan views of the slide for feeding the lower washer or disk, showing this slide in different operative positions.

Fig. 7 is a sectional view taken on the line 7—7 of Fig. 6.

Fig. 8 is a sectional view taken on the line 8—8 of Fig. 5.

Fig. 9 is a detail view of one of the disks or washers.

Fig. 10 is a view of an envelope after the attaching means have been secured thereto by the machine.

Fig. 11 is an enlarged cross sectional view of a portion of the operating mechanism, taken on line 11—11 of Fig. 3.

Fig. 12 is a sectional view taken on the line 12—12 of Fig 4, looking in the direction of the arrows Fig. 13 is a sectional view taken on the line 13—13 of Fig. 12, looking in the direction of the arrows.

Fig. 14 is a sectional view taken on the line 14—14 of Fig. 12, looking in the direction of the arrows.

Figure 1:
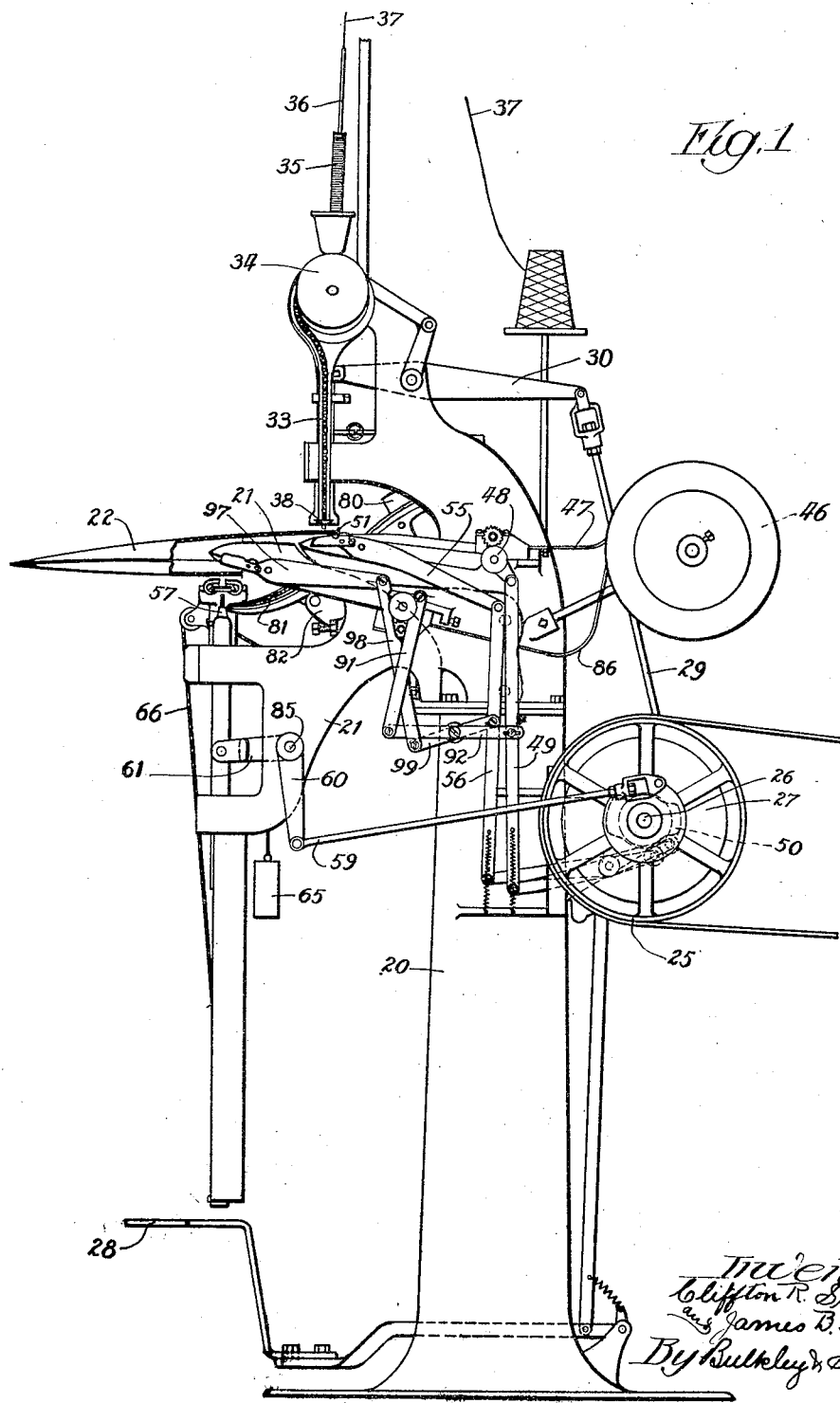
Figure 1 is an elevation of a machine embodying the features of our invention looking at one side thereof.
Figure 2:
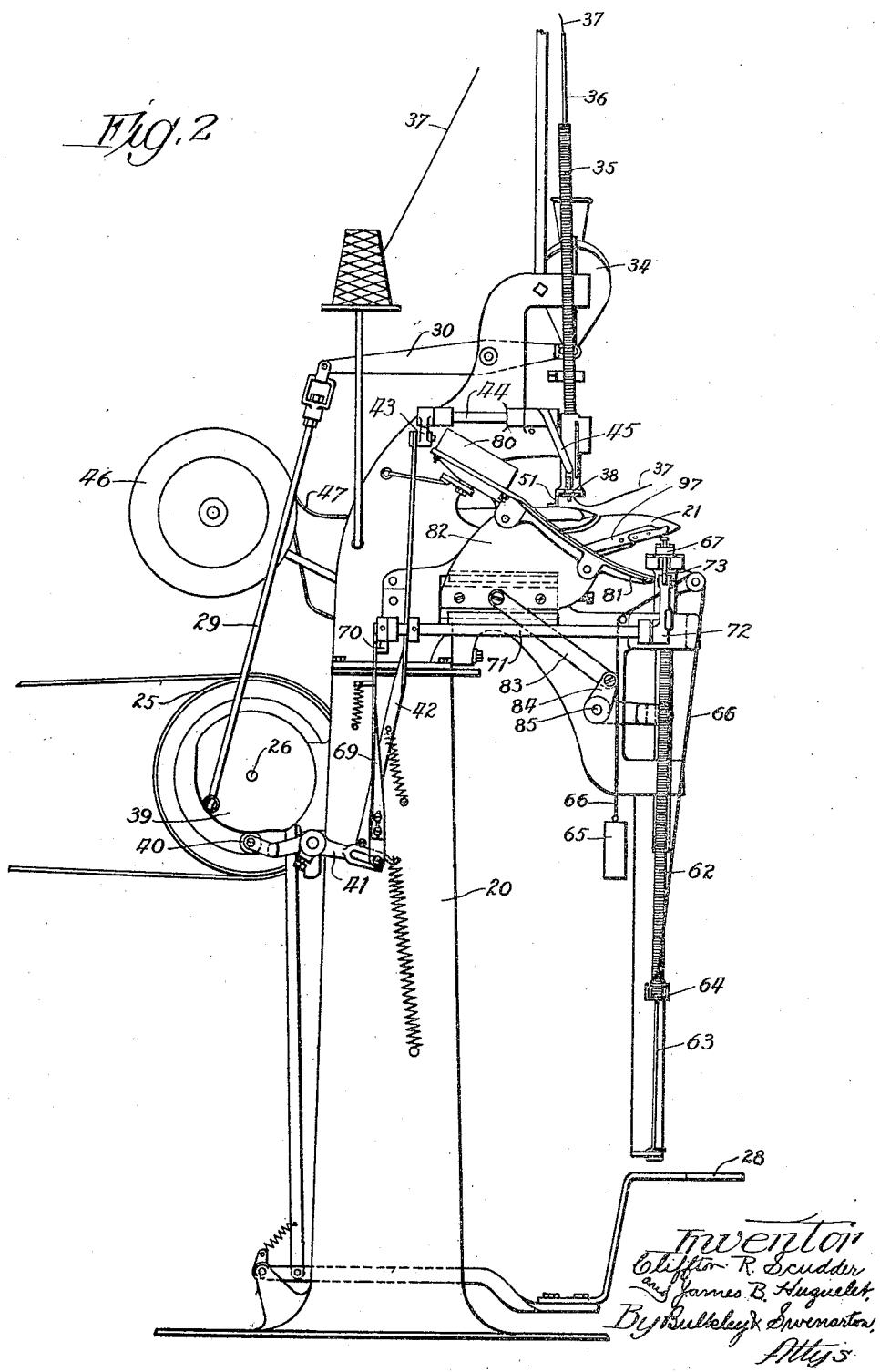
Fig. 2 is a similar view, looking at the opposite side thereof.

Our machine consists essentially of an upright frame 20 having a forwardly extending supporting bed 21 which is formed with a pointed nose adapted to be inserted within the envelope 22 to which the fastening means are to be secured. As shown in Fig. 1, when the envelope is in position, the seal flap is supported by the upper surface of the supporting bed while the forward edge of the body of the envelope is adjacent the lower surface of the projecting nose of this supporting bed. Mounted on the upper surface of the supporting bed is an anvil 23 co-operating with which there is suitable mechanism including a punch, eyelet feed, disk and string feeding mechanism for feeding and securing to the seal flap of the envelope the disk and string attaching means. There is also associated with this mechanism, means for feeding and securing a reinforcing washer to the opposite surface of the seal flap.

Carried by the lower face of the projecting nose of the supporting bed 21 is an anvil 24 co-operating with which there is a plunger and eyelet, disk, and reinforcing washer feeding means, somewhat similar to those co-operating with the upper die except that the mechanism co-operating with the lower die has been modified and changed somewhat in order to enable the same to operate upwardly against the lower surface of the supporting bed as contra-distinguished from the first mechanism which operates downwardly against the upper surface of the supporting bed.

The mechanism shown in association with the upper anvil is of itself no part of our present invention, except in so far as this upper operating mechanism co-operates with the mechanism associated with the lower anvil in making a machine which operates to simultaneously and by one operation apply the fastening means to both the seal flap and the body of the envelope.

The power for driving the entire mechanism is derived from a driving pulley 25, which is connected to the shaft 26 through a suitable one revolution clutch mechanism 27 indicated diagrammatically, which clutch can be of any well known type and is controlled by the foot-pedal 28 so that upon operating the same the shaft 26 is caused to make one complete revolution, all in the manner well understood in connection with the operation of machines of this character. Connected to the driven member of the clutch 27 is a crank arm 29, the upper end of which is connected to the rocking arm 30, the opposite end of which is connected to the reciprocating plunger 31, which plunger carries at its lower end the yielding pin 32, which is adapted to engage with an eyelet in the eyelet-chute 33, to which eyelets are fed from a hopper 34 in the usual and well known manner. This eyelet-chute is pivotally mounted and adapted to be swung out of the way of the plunger as it descends in the manner well understood in the art. Adjacent to the plunger 31 there is a stack of disks or washers 35 mounted upon a hollow rod 36 through which rod the string 37 is fed. At the bottom of this stack of disks there is a reciprocating slide 38 which is reciprocated through the medium of suitable connections from the cam 39, mounted on the shaft 26 engaging with which cam is a roller 40 carried by one end of the pivoted arm 41. Connected with the opposite end of this arm is an upwardly extended arm 42, the upper end of which is connected to a crank 43 on one end of a horizontal shaft 44. Secured to the opposite end of this shaft is an arm 45 connected to the slide, the arm 45 being provided with a handle for hand operation of the slide, whereby this slide is reciprocated to feed the lower disk forwardly over the die 23 and in a position to be engaged by the descending pin 32 carried by the plunger 31. While the disk and eyelet are thus being fed to the upper surface of the seal flap, a reinforcing washer is being fed from the paper reel 46 into position to be secured to the opposite surface of this flap. A strip of paper 47 wound upon this reel is passed through a pair of feed rollers 48 which are operated through the medium of a connecting link 49 and a cam 50 on the shaft 26 so as to feed the paper forwardly step by step.

As this paper is fed forward, it passes between a pair of clamping members 51—52 provided with cutting edges which engage with a cutting member 53. A punch 54 is likewise supported beneath the clamping members 51—52, and is adapted to pass through openings in these members. These clamping members are carried on the forward end of a pivoted member 55, the rear end of which is connected to a connecting link 56 and is adapted to be reciprocated through the operation of a cam mounted upon the shaft 26 so that as the paper is fed forwardly over the anvil 23, the arm 55 is rocked so as to move the cutting edges of the clamping members 51—52 downward against the cutter 53, thus cutting off a section of the paper so as to form a reinforcing washer. At the same time the punch 54 punches a hole in the section of the paper to be used as the next succeeding reinforcing washer.

The mechanism for applying the fastening means to the body of the envelope and which co-operates with the anvil 24 on the under face of the supporting bed, with which mechanism our invention is chiefly concerned, consists as heretofore stated of elements somewhat similar to those already described in connection with the mechanism co-operating with the upper anvil. There is provided a reciprocating plunger 57 which carries a spring-pressed pin 58, which plunger is adapted to be reciprocated through the medium of the crank 59 and connecting links 60—61. A stack of washers or disks 62 are mounted upon a rod 63, but instead of being fed by gravity, as in the case of the upper washers, it is necessary to provide a positive means for feeding these disks upwardly on this rod. This is accomplished by means of a carriage 64 which engages the lowermost disks and is forced upwardly by power derived from the weight 65 which is connected to this carriage through the medium of a rope 66. In this manner there is a constant upward pressure on the disks so that the upper disk is forced into position to be engaged by the reciprocating slide 67. (See Fig. 7.) This slide is provided with a shoulder 68 so that as the slide is reciprocated it engages with the top washer and feeds the same laterally off the top of the stack. This slide is adapted to be reciprocated by the operation of the cam 39 mounted on the shaft 26 and rocking arm 41 to the outer end of which the arm 69 is secured, the upper end of this arm being secured to a crank 70 on one end of a shaft 71. To the opposite end of this shaft a crank 72 is connected, the opposite end of which is connected to the depending lug 73 on the slide 67. This construction is such that as the cam 39 rotates, the slide 67 is reciprocated so as to feed the upper disk or washer in the stack 62 forwardly into a position to be engaged by the spring pin 58 in the end of the reciprocating plunger 57. In order to properly support the washer when it is thus fed off the top of the stack, it is necessary to provide special supporting means such as are shown in detail in Figs. 5 to 8. This consists essentially of a supporting member 74 mounted upon the slide 67, which supoprting member is provided with a forwardly extending portion 75 having a pair of downwardly curved supporting arms 76 which are in a position to receive and hold the washer. The end of the supporting member 74 is cut away at 77 to permit the yielding pin 58 to engage with a washer supported by the slide. This supporting slide 74 is connected to the main slide 67 by a spring connection 78 and the main slide 67 is provided with an upwardly projecting portion 79 which, upon the forward movement of the slide 67, is adapted to engage the forward end of the supporting slide 74 and force the same outwardly into the position shown in Fig. 5. That is, in operation the slide is normally in the position shown in Figs. 6 and 7, but as the slide 67 is forced outwardly it picks the disk off the top of the stack and moves the same on to the supporting arms 76 and then the slide 67 and supporting members 74 move together until this disk is carried into a position immediately over the spring-pressed pin 58. Then as this pin moves upwardly, the washer is slipped over the end of the pin and then the slide 67 is retracted and the spring 78 pulls the supporting member 74 backwardly so that this supporting member is moved out of the path of the reciprocating plunger 57.

The eyelets for the lower fastening means are supplied from a suitable hopper 80 down the eyelet-chute 81, which eyelet chute is carried by a sliding member 82 which is adapted to be reciprocated through the medium of the link 83, the opposite end of which is connected to the arm 84, upon one end of a stud shaft 85, which shaft is reciprocated through the medium of the connections 59 and 60 in the manner hereinbefore described. In this way this eyelet-chute is moved in and out of the path of the plunger 57.

In order to supply a reinforcing washer to the inner surface of the body of the envelope, the strip of paper 86 is fed between the feeding rollers 87—88, which are rotated so as to advance the paper step by step through the medium of the pawl and ratchet connections 89 and 90 controlled by the arm 91, the opposite end of which arm is connected to the pivoted lever 92 which in turn is connected to the arm 49 operated by the cam 50. The paper is fed between the two clamping jaws 93—94 which jaws are provided with cutting edges co-operating with the cutter 95. A punch 96 is adapted to pass through openings in these two clamping members, which clamping members are carried on the forward end of a pivoted arm 97 and is adapted to be rocked through the medium of the connections 98—99, which are connected to the reciprocating rod 56 which controls the upper cutting mechanism heretofore described.

With this construction, it will be seen that as the clutch is operated by the foot-pedal to make one revolution, that a disk is fed forwardly from the upper stack in a position to be engaged by the spring finger 32 of the upper reciprocating plunger, which finger as it descends picks the lower eyelet from the chute and forces the same against the anvil 23, thus upsetting the eyelet and securely fastening the upper washer and string to the flap and at the same time securely fastening to the flap the reinforcing washer cut from the forward end of the paper strip 47. At the same time that these fastening means are thus applied to the flap of the envelope, the reciprocating slide 67 is operated to feed a disk off the top of the lower stack onto the supporting fingers 76, which supporting fingers are then moved forwardly with the slide to a position over the spring-pressed finger 58 of the reciprocating plunger 57. As this plunger is moved upwardly, it first picks off an eyelet from the chute, which chute is then reciprocated out of the path of the plunger, and then the spring-pressed finger passes through the opening in the disk or washer held by the supporting finger 76, which supporting fingers are then withdrawn with the slide 67, and then the plunger continues into engagement with the anvil 24 to thereby upset the eyelet and securing the disk or washer to the body of the envelope. At the same time the paper strip 86 has been fed forwardly and cut off by the cutter 95, so that a reinforcing washer is secured to the inner surface of the envelope.

It will thus be seen that we have devised a very efficient machine in which the attaching means can be applied simultaneously to the seal flap of the envelope and to the body of the envelope by a single operation of the machine, and while we have described one specific embodiment of our invention, it will be understood that we do not wish to be limited to the exact construction shown and described, but that various changes and modifications may be made without departing from the spirit and intent of our invention.

What we claim as our invention is:

1. In a machine of the class described, eyelet setting means for securing a circular disk or washer to the body portion of an envelope, and a second eyelet setting means for simultaneously securing a circular disk or washer to the seal flap of the envelope.

2. In a machine of the class described, eyelet setting means for securing a circular disk or washer to one side of the body portion of an envelope and a reinforcing washer to the opposite side of said body portion, and a second eyelet setting means for simultaneously securing a circular disk or washer to one side of the seal flap of said envelope and a reinforcing washer to the opposite side of said seal flap.

3. In a machine of the class described, a supporting bed, an anvil mounted on the upper surface of said bed, a second anvil on the lower surface of said supporting bed, said anvils being in position to engage with the seal flap and body portion of an envelope, and mechanism co-operating with each of said anvils for automatically securing disk and eyelet fastening means to the seal flap and body portion of an envelope.

4. In a machine of the class described, a supporting bed having a nose adapted to project within the open end of an envelope, the seal flap of the envelope resting on top of said nose and the body portion of said envelope engaging beneath the nose, an anvil on top of the supporting bed adapted to engage with the seal flap of the envelope, a second anvil mounted upon the lower portion of the supporting bed, and adapted to engage with the body portion of the envelope, means for feeding a circular disk or washer to a point above said first anvil and above the seal flap of the envelope, eyelet setting means for securing said disk to said seal flap, means for feeding a circular disk or washer to a position adjacent the second anvil and on one side of the body portion of the envelope, and eyelet-setting means for securing said disk to the body portion of the envelope.

5. In a machine of the class described, a supporting bed having a nose adapted to project within the open end of an envelope, the seal flap of the envelope resting on top of said nose and the body portion of said envelope engaging beneath the nose, an anvil on top of the supporting bed adapted to engage with the seal flap of the envelope, a second anvil mounted upon the lower portion of the supporting bed and adapted to engage with the body portion of the envelope, means for feeding a circular disk or washer to a point above said first anvil and above the seal flap of the envelope, means for feeding a reinforcing washer over said anvil beneath said seal flap, eyelet setting means for securing said disk and washer to said seal flap, means for feeding a circular disk or washer to a position adjacent the second anvil and on one side of the body portion of the envelope, means for feeding a reinforcing washer over said second anvil and upon the opposite side of the body portion of the envelope, and eyelet-setting means for securing said disk and reinforcing washer to the body portion of the envelope.

Signed by me at St. Louis, Mo., this 9th day of June, 1920.

CLIFFTON R. SCUDDER.

Signed by me at Chicago, Ills., this 17th day of June, 1920.

JAMES B. HUGUELET.